United States Patent [19]

Freismuth et al.

[11] Patent Number: 5,018,822
[45] Date of Patent: May 28, 1991

[54] ENVIRONMENTALLY SEALED MULTICHANNEL FIBER OPTIC CONNECTOR

[75] Inventors: John S. Freismuth, Cheshire; Robert G. Knowles, Northfield, both of Conn.

[73] Assignee: Litton Systems, Inc., Watertown, Conn.

[21] Appl. No.: 448,794

[22] Filed: Dec. 11, 1989

[51] Int. Cl.$^5$ .......................... G02B 6/36; G02B 7/26
[52] U.S. Cl. .............................. 350/96.20; 350/96.22
[58] Field of Search ............... 350/96.20, 96.21, 96.22

[56] References Cited

U.S. PATENT DOCUMENTS

| | | | |
|---|---|---|---|
| 4,725,117 | 2/1988 | Ellis | 350/96.20 |
| 4,772,081 | 9/1988 | Borgos | 350/96.20 |
| 4,815,812 | 3/1989 | Miller | 350/96.20 |

*Primary Examiner*—William L. Sikes
*Assistant Examiner*—Robert E. Wise
*Attorney, Agent, or Firm*—Brian L. Ribando

[57] ABSTRACT

A multichannel separable fiber optic connector includes two-part splice fixtures which are retained in the center body of the connector. A keying arrangement between the splice fixture halves and the center body insure that the fixture halves are always mated together in the same angular relationship, and a common sleeve in the center body aligns the fixture halves along a common surface. The optic fibers and fiber splices are protected by removable backshells which are environmentally sealed to the center body and to the cable jacket.

6 Claims, 3 Drawing Sheets

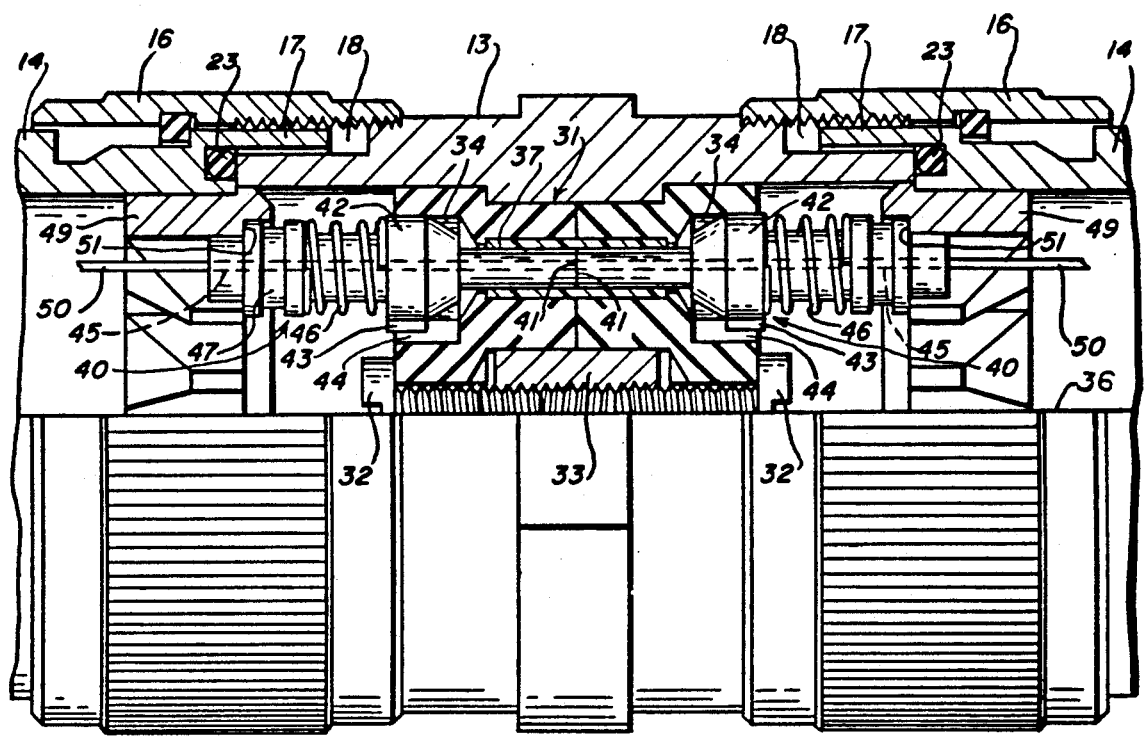
Fig_2
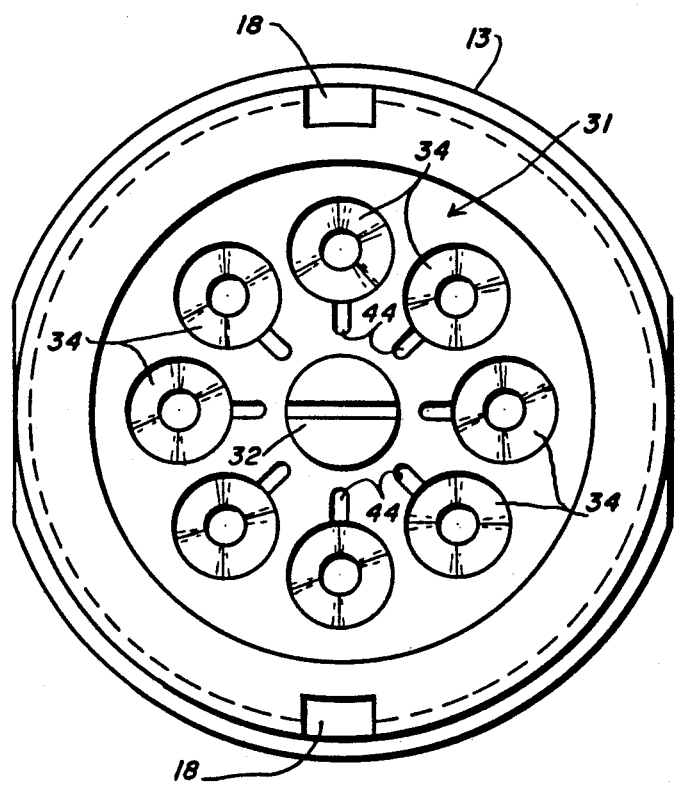
Fig_5

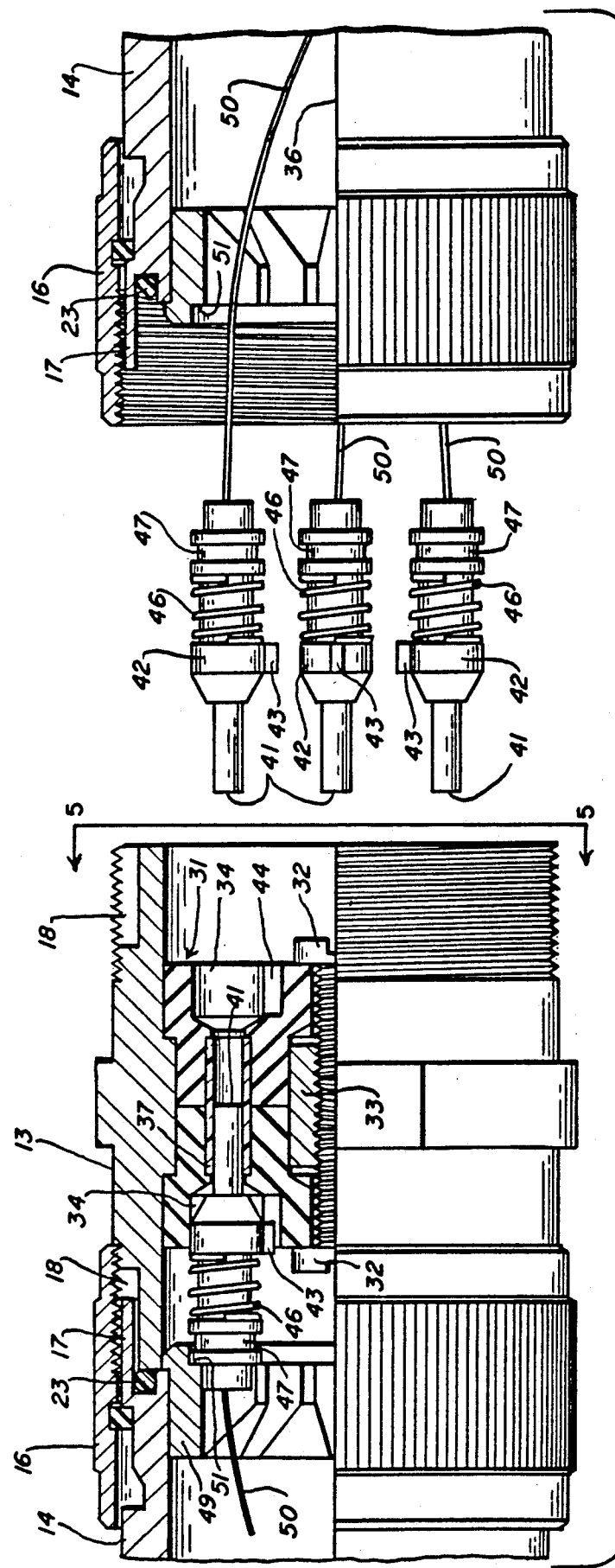
Fig_4

ENVIRONMENTALLY SEALED MULTICHANNEL FIBER OPTIC CONNECTOR

BACKGROUND OF THE INVENTION

The invention relates to an environmentally sealed multichannel fiber optic connector.

The use of optic fibers for signal transmission is well known in the art. Optic fibers offer the advantages of low signal attenuation, increased bandwidth, and immunity from electrical and magnetic field interference. The fibers themselves vary in size from 0.002-0.010 of an inch in diameter; and many fibers, each carrying a separate signal, are often bundled together into a single cable.

While it is often desirable to be able to break a fiber optic cable and then reconnect the individual fibers together again—for instance, when changing equipment which is attached to the cable or when ducting the cable through a bulkhead—such separable connectors for optic cables present a myriad of problems. Since the individual optic fibers in the cable are of such small diameter, it is imperative that any connector which is used rejoin the severed fiber ends in exact alignment; or substantial signal attenuation will result. A pair of cylindrical ferrules or sleeves is often used as part of a separable connector for optic fibers; but because of the small diameter of the fiber itself and of the bore in the ferrule which receives the fiber, the exact alignment of the bores in two abutting ferrules is very difficult to achieve.

One commercial approach taken by the American Telephone & Telegraph Company ("AT&T") involves the use of a two-part rotary splice which is manufactured and sold as one piece and is split into abutting halves by the customer. During the manufacturing process, the two joined parts are formed with a common bore which insures concentricity of the bore through the length of the parts. Each part is provided with a keying means, and a splice holder also sold by AT&T receives the parts in only one angular orientation due to the presence of keyways in the holder. As a result, the two splice parts may be separated from one another and thereafter rejoined; and because the same angular orientation between the parts is always used in the rejoining process, accurate alignment of the bores in the two splice halves is insured. In spite of these advantages, the AT&T unit is not a separable connector but rather a box-shaped splice fixture which does not lend itself to separation and a reconnection of optic fibers in the field by untrained personnel, nor is the fixture environmentally sealed.

There is, accordingly, a need in the art for a environmentally sealed multichannel fiber optic connector which may be easily disconnected and reconnected by unskilled personnel and which insures accurate alignment of the reconnected fiber ends.

SUMMARY AND OBJECTS OF THE INVENTION

According to the invention, a multichannel fiber optic connector for a fiber optic cable comprises a cylindrical housing having a center body and two separable backshell portions. Each backshell portion is environmentally sealed to the center body and to the cable jacket, and removal of a backshell portion allows access to a plurality of rotary splice units which are retained by the center body. Each of the rotary splice units may be uncoupled from the center body, and keying means in the center body insures that the rotary splice can only be rejoined to the center body in one angular orientation.

It is, accordingly, an object of the invention to provide a multichannel fiber optic connector comprising a center body and two separable backshell portions.

It is another object of the invention to provide a multichannel fiber optic connector in which a backshell portion may be removed from the center body of the connector to allow access to a plurality of rotary splices which are retained in the center portion.

It is another object of the invention to provide a multichannel fiber optic connector in which a plurality of rotary splices are designed to be coupled together in only one angular orientation in order to preserve the alignment of the optic fibers joined by the splices.

It is another object of the invention to provide a multichannel fiber optic connector which is easy to disassemble for field repair and is environmentally sealed to provide protection to the optic fibers and splices contained therein.

These and other objects of the invention will become apparent from the following description in which reference numerals used throughout the description correspond to those found on the drawing figures.

BRIEF DESCRIPTION OF THE DRAWINGS

FIG. 2 shows a detail of the connector of FIG. 1.

FIG. 4 shows the connector of FIG. 1 with the right backshell separated from the center body.

FIG. 5 is a view by the left taken along line 5—5 of FIG. 4.

DESCRIPTION OF THE PREFERRED EMBODIMENT

Figure 1:
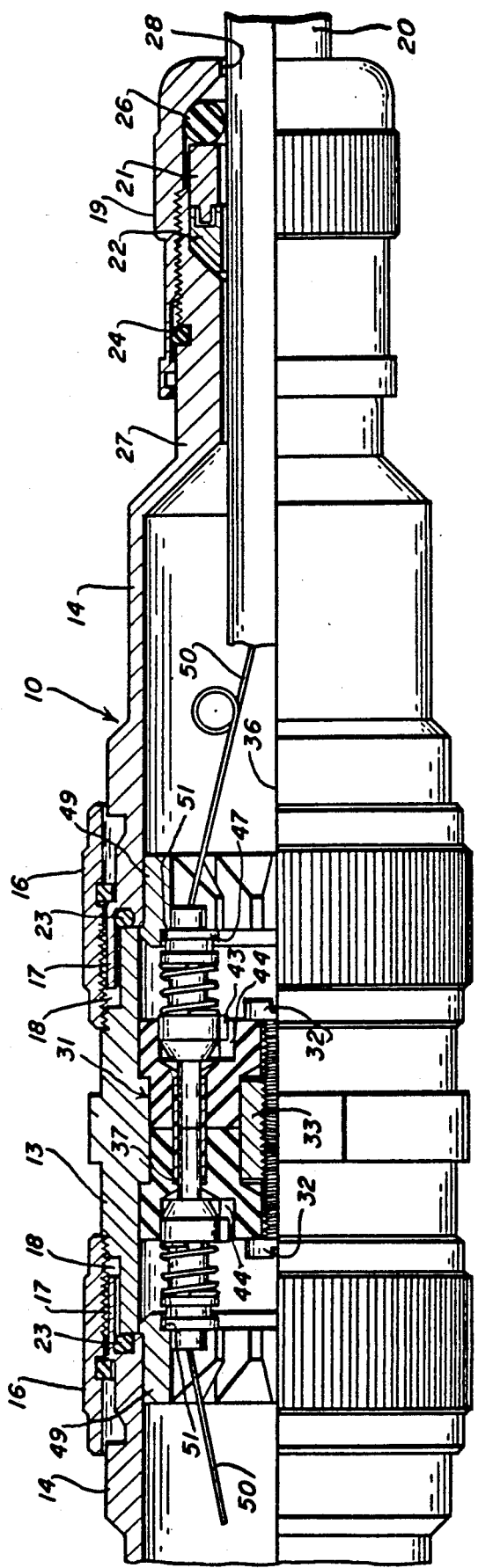
FIG. 1 is partial side view, partly in section of a multi-channel fiber optic connector according to the invention.

Turning now to the drawing figures, there is shown in FIG. 1 a multichannel fiber optic connector generally designated by the reference numeral 10. The connector includes a center body 13 and two backshells 14 (the left backshell 14 being only partially shown). The backshells are removably attached to the center body 13 by means of coupling nuts 16; and a prong 17 formed on each backshell 14 engages a notch 18 on the center body 13 to prevent twisting of the backshell 14 as the coupling nuts 16 are rotated. The end of each backshell 14 is provided with a backnut 19 which captures a spacer 21 and a grip ring 22 which secures the backshell to the jacket of a fiber optic cable 20 for strain relief as well known in the art. The center body 13 and the backshells 14 are environmentally sealed by means of an O ring 23 located at the junction between the backshell 14 and the center body 13, an O ring 24 located between the back nut 18 and the neck 27 of the backshell, and an O ring 26 located at the cable aperture 28 between the inside surface of the back nut 18, the spacer 21, and the cable 20.

The center body 13 houses a two-part retainer 31 which is held together by two screws 32 and a common nut 33. The retainer 31 includes splice apertures 34 which extend from one side of the retainer to the other in a direction which is generally parallel to the axis 36 of the connector. Each splice aperture 34 is lined by an alignment sleeve 37 which forms a common alignment surface between the two parts of the retainer 31.

A two-part rotary splice 40 having a fiber bore 45 is mounted in the alignment sleeve 37 and the end faces 41 of the two splice parts 42 abut at a midpoint in the alignment sleeve, best seen in FIG. 2. Each rotary splice part 42 includes a keying means 43 which is received by a keyway 44 formed at the entrance of each splice aperture 34, a compression spring 46, and a spring retainer 47. A compression plate 49 mounted in the backshell 14 contains a plurality of shouldered apertures 51, each of which receives a spring retainer 47 mounted on one of the rotary splices 40. The compression plate 49 is fixed in place in the backshell 14 and presses on the spring retainers 47 to maintain the splice parts 42 in engagement with the splice apertures 34.

Each splice part receives the bared end of an optic fiber 50 from the optic cable 20. The bared optic fiber end is threaded into the fiber bore 45 in the splice part 42 to protrude from the end face 41. As well known in the art, the fiber end may then be cleaved flush with the end face and polished to obtain maximum signal transfer from the fiber. If desired, the fiber may be cemented in place in the bore 45 to prevent pistoning of the fiber end in the fiber bore 45.

FIG. 5 shows an end view of the retainer plate 31 including the plurality of splice apertures 34 which receive the rotary splices (not shown) and the keyways 44 which receive the keys 43 formed on the rotary splices. The outer surface of the center body 13 includes the locating notches 18 which receive the prongs 17 formed on the backshell 14 and prevent rotation of the backshell as the coupling nuts are tightened or loosened relative to the center body 13.

Figure 3:
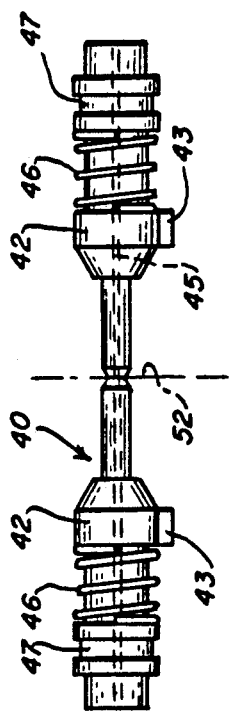
FIG. 3 shows the rotary splice used in the invention.

FIG. 3 shows a rotary splice 40 before being broken into two pieces along the parting line 52 to form the two end faces 41. It will be appreciated that since the fiber bore 45 is formed in the rotary splice 41 while the two splice parts 42 are in a unitary relationship, the fiber bore 45 in the two parts of the splice will be in exact alignment. Once the splice has been broken into two separate parts 42, this exact alignment can be duplicated if the two parts are abutted to one another in axial alignment and in the same angular relationship which existed when the fiber bore 45 was formed. In order to achieve this result, the alignment sleeve 37 in the splice aperture 34 axially aligns the two splice parts 42 relative to one another; and the keyways 44 formed in the retainer 31 force the keys 43 and the splice parts 42 to assume the same angular relationship which existed when the rotary splice was manufactured.

As shown in FIG. 4, the backshell 14 may be detached from the center body 13 by loosening the coupling nut 16 and displacing the backshell to allow access to the optic fibers 50 and the splice parts 42 (only 3 shown). Although all of the splice parts 42 are shown withdrawn from the alignment sleeves 37 in the retainer 31, a service loop in each of the optic fibers 50 allows displacement of the backshell and removal of only those splice parts 42 from the retainer 31 which require inspection or repair. Of course, it will be understood that the left side backshell 13 may in a similar manner be removed from the center body 13 for inspection or repair of the splice parts contained therein.

Having thus described the invention, various alterations and modifications will to occur to those skilled in the art which alterations and modifications are intended to be within the scope of the invention as defined by the appended claims.

What is claimed:

1. A multichannel separable fiber optic connector comprising:
   an elongated cylindrical housing comprising a center body and a pair of backshells removably attached to either side of the center body, the cylindrical housing having an axis which extends from one end of the housing to the other;
   a retainer mounted in the center body having at least one splice aperture formed therein extending from one side of the retainer to the other in a direction which is generally parallel to the axis of the housing;
   a keyway formed in both ends of each splice aperture;
   a two-part rotary splice comprising two splice parts, each splice part having a fiber bore for receiving an optic fiber, an end face on one end, and an external key on the other end which mates with said keyways; and
   means for holding each splice part in engagement with a splice aperture with the two end faces of the splice parts in an abutting relationship with one another, whereby the keyways in the ends of each mounting aperture allows insertion of the splice part in only one angular orientation.

2. The connector of claim 1 further comprising:
   a single sleeve lining each splice aperture, whereby said single sleeve aligns the two parts of each rotary splice part along a common surface.

3. The connector of claim 2 further comprising:
   a plurality of splice apertures and two-part rotary splices; and
   a compression plate mounted in each backshell, said compression plate engaging the end of each rotary splice which extends from the retainer into the backshell, said compression plate comprising said means for holding.

4. The connector of claim 3 further comprising:
   a prong formed on the backshell and a notch formed on the center body, whereby the engagement of the prong in the notch prevents rotation of the backshell relative to the center body during attachment of the backshell to the center body.

5. The connector of claim 4 further comprising:
   a coupling nut on each backshell for removably attaching the backshells to the center body.

6. The connector of claim 3 further comprising:
   a cable aperture in one end of each backshell for receiving a fiber optic cable; and
   first sealing means at each cable aperture for sealing between the backshell and the cable; and
   second sealing means at the junction of the center body with each backshell, whereby the interior of the connector is environmentally sealed from the exterior.

* * * * *